(No Model.)
W. B. LOGAN.
BLANKET FOR ANIMALS.
No. 352,470. Patented Nov. 9, 1886.
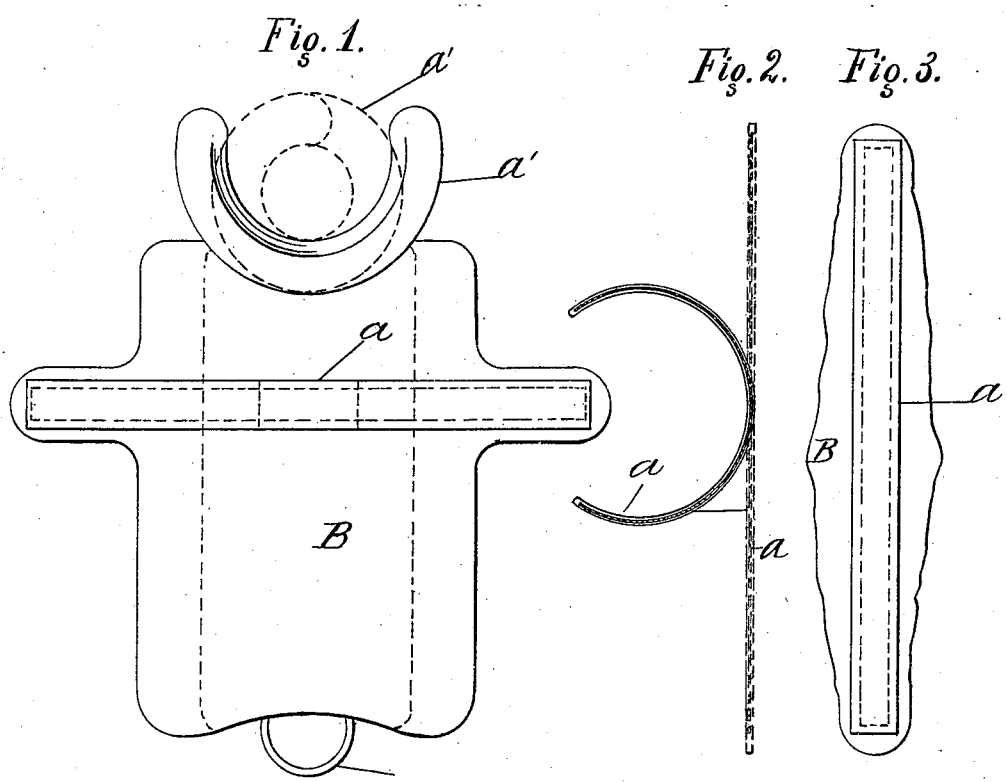
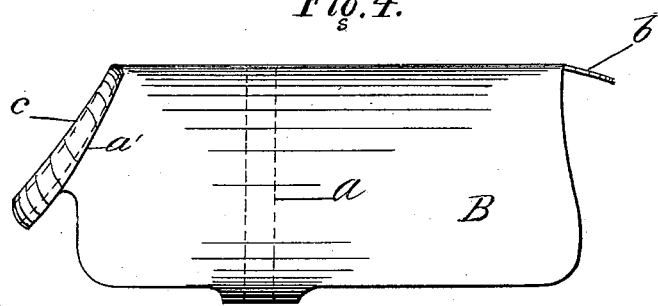
Witnesses.
Wm. G. Needham
W. C. Bernhardt
Inventor.
William B Logan
by W. J. Dennis
attorney
N. PETERS, Photo-Lithographer, Washington, D. C.

United States Patent Office.

WILLIAM BRITTON LOGAN, OF RICHMOND, INDIANA, ASSIGNOR OF ONE-HALF TO G. W. MASCHMEYER, OF SAME PLACE.

BLANKET FOR ANIMALS.

SPECIFICATION forming part of Letters Patent No. 352,470, dated November 9, 1886.

Application filed June 26, 1886. Serial No. 206,283. (No model.)

*To all whom it may concern:*

Be it known that I, WILLIAM BRITTON LOGAN, a citizen of the United States, residing at Richmond, in the county of Wayne and State of Indiana, have invented certain new and useful Improvments in Blankets for Animals, of which the following is a specification, reference being had therein to the accompanying drawings.

My invention relates to that class of blankets and covers used on domestic animals.

My invention consists in spring-bands sewed onto or attached to the waist or girth and to the neck of the blanket, which by its shape and elasticity serves to retain the blanket or cover in its position on the animal.

In the drawings, Figure 1 is an outline top plan view of a blanket, showing the spring-bands at the waist and neck when straight. Fig. 2 is a vertical edge elevation of the spring-band in its curved form, and as opened out straight in dotted lines. Fig. 3 is a vertical elevation of the spring-band, with the section of a blanket to which it is attached. Fig. 4 is a side elevation of the blanket in the form it presents when in use.

In Fig. 1, $a$ represents the spring-band sewed into the body of the blanket at the waist. B represents the body of the blanket and $c$ the neck of the same. $a'$ is a spring-band, which is connected to the neck part of the blanket at such an angle from a vertical line as may be required to properly fit the animal, as shown in Fig. 4.

In Fig. 2, $a$ represents the spring-band presented edgewise, both curved, as it is when on the animal, and extended out straight.

In Fig. 4, $a'$ represents the spring-band attached to the neck of the blanket by being sewed into the same, or in any other suitable manner, at such an angle as will best fit the neck of the animal for which it is intended, and so arranged as to fit the neck closely, clasping the same by the tenacity of the spring with sufficient grip to hold it steadily in place.

The spring-band $a$ is inserted in the blanket by being sewed in or in any other suitable manner, so as to occupy the position of a girth or surcingle, the functions of which, in retaining the blanket in its proper position on the animal, it is intended to perform. In fitting it upon the animal, the spring-bands $a$ and $a'$ are opened out, spreading the ends apart sufficiently to allow them, with the edges of the blanket, to pass down over the body of the animal, when the spring-bands accommodate themselves to the form of the animal, and the blanket is securely held in position and closely fitted to the animal. These spring-bands constitute a self-acting fastening for blankets, and have the further advantage of being able to accommodate themselves to different sizes of bodies. They are readily fitted to the animal and much more readily removable than the ordinary fastenings—such as buckles, buttons, and strings—as a person may sit in his carriage, and, by taking hold of the crupper $b$, withdraw the blanket from his horse.

Having thus fully described my said improvement, what I claim as new, and desire to secure by Letters Patent, is—

The combination, with a blanket or cover for animals, of the spring-bands $a$ around the body and $a'$ about the neck, in the manner and for the purpose as herein set forth.

In testimony whereof I affix my signature in presence of two witnesses.

WILLIAM BRITTON LOGAN.

Witnesses:
    WILLIAM T. DENNIS,
    WM. A. PEELLE.